(12) United States Patent
Hayden, Sr.

(10) Patent No.: US 9,116,263 B2
(45) Date of Patent: Aug. 25, 2015

(54) SYSTEM AND METHOD FOR DETECTING A FAILURE IN A FIELD REPLACEABLE UNIT

(75) Inventor: Perry L. Hayden, Sr., Salinas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 748 days.

(21) Appl. No.: 12/402,142

(22) Filed: Mar. 11, 2009

(65) Prior Publication Data

US 2010/0231406 A1   Sep. 16, 2010

(51) Int. Cl.
*G08B 3/00* (2006.01)
*F21V 8/00* (2006.01)

(52) U.S. Cl.
CPC ................................. *G02B 6/0008* (2013.01)

(58) Field of Classification Search
USPC ..................................................... 340/691.1
See application file for complete search history.

(56) References Cited

U.S. PATENT DOCUMENTS

| | | |
|---|---|---|
| 6,084,178 A | 7/2000 | Cromwell |
| 6,240,211 B1 | 5/2001 | Mancuso et al. |
| 6,438,390 B1 * | 8/2002 | Awan ............................ 455/566 |
| 7,107,490 B2 | 9/2006 | Eisenhoffer et al. |
| 7,168,007 B2 | 1/2007 | Gilstrap et al. |
| 7,454,657 B2 | 11/2008 | Duron et al. |
| 2004/0123095 A1 * | 6/2004 | Marshall ........................ 713/153 |
| 2004/0181367 A1 * | 9/2004 | Nguyen et al. ................ 702/183 |
| 2005/0018396 A1 * | 1/2005 | Nakajima et al. ............. 361/683 |
| 2008/0075579 A1 * | 3/2008 | Pchuang ........................ 415/118 |
| 2008/0205070 A1 * | 8/2008 | Osada ............................ 362/368 |
| 2008/0276506 A1 * | 11/2008 | McLachlan ..................... 40/541 |
| 2008/0320322 A1 * | 12/2008 | Green et al. .................. 713/340 |

* cited by examiner

*Primary Examiner* — Ojiako Nwugo
(74) *Attorney, Agent, or Firm* — Patent Capital Group

(57) ABSTRACT

An apparatus is provided in one example embodiment and includes a light guide configured to couple to an electronic unit. The electronic unit is a replaceable unit of an electronic component, the light guide extending along a body structure of the electronic unit and signaling an operational state of the electronic unit. In more specific embodiments, the light guide communicates optical energy from a light source coupled to the electronic unit and configured to indicate the operational state of the electronic unit. In still other embodiments, the light source is a light emitting diode (LED) that indicates the operational state of the electronic unit. The light guide can include a light input that enhances an optical coupling between the light source the light guide. In still other embodiments, the light guide includes a curved portion that changes a direction of optical energy propagating within the light guide.

16 Claims, 3 Drawing Sheets

SYSTEM AND METHOD FOR DETECTING A FAILURE IN A FIELD REPLACEABLE UNIT

TECHNICAL FIELD OF THE INVENTION

The present disclosure relates generally to component failures and, more particularly, to detecting a failure in a field replaceable unit.

BACKGROUND OF THE INVENTION

Computing devices typically incorporate field replaceable units such as cooling fans. These units may be quickly removed from the device hosting it and replaced if necessary. This procedure occurs, for example, if the unit fails. Electronic equipment can be sensitive to user mishandling when conducting such a procedure. In addition, miscalculations in identifying which components are faulty can waste time and result in damage to costly electronic equipment.

BRIEF DESCRIPTION OF THE DRAWINGS

In order to provide a better understanding, example embodiments will now be described in detail, by way of example only, with reference to the accompanying figures, in which.

DETAILED DESCRIPTION OF EXAMPLE EMBODIMENTS

Overview

An apparatus is provided in one example embodiment and includes a light guide configured to couple to an electronic unit. The electronic unit is a replaceable unit of an electronic component, the light guide extending along a body structure of the electronic unit and signaling an operational state of the electronic unit. In more specific embodiments, the light guide communicates optical energy from a light source coupled to the electronic unit and configured to indicate the operational state of the electronic unit. In still other embodiments, the light source is a light emitting diode (LED) that indicates the operational state of the electronic unit. The light guide can include a light input that enhances an optical coupling between the light source the light guide. In still other embodiments, the light guide includes a curved portion that changes a direction of optical energy propagating within the light guide. The electronic unit includes a status indicator light that is mounted on a circuit board and that indicates the operational state of the electronic unit. The status indicator light emits flashes, color changes, or intensity changes to signal the operational state of the electronic unit.

Figure 1:
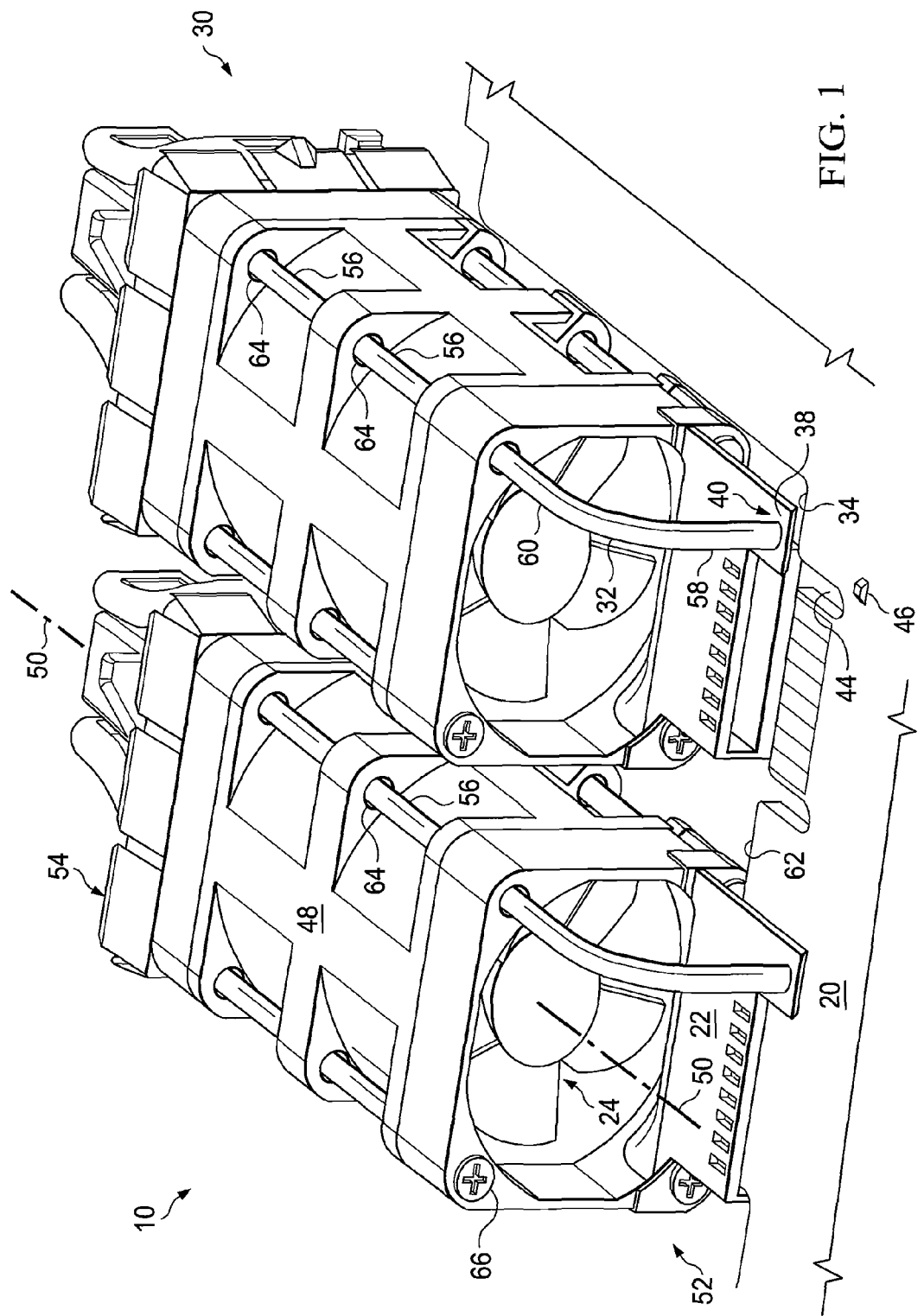
FIG. 1 is a simplified schematic diagram that illustrates a front perspective view of example electronic units in accordance with one embodiment.

FIG. 1 is a simplified schematic diagram that illustrates a front perspective view of two example electronic units in accordance with one embodiment, where the left hand unit is connected to a circuit board and the right hand unit being detached from the circuit board. In one example implementation, the units are field replaceable units (FRUs), which are generally indicated by a set of arrows 10 and 30. Units 10 and 30 may be part of any suitable electronic component, as detailed below. Unit 10 is connected to a circuit board 20 through a connector 22, which can be included on unit 10. Circuit board 20 forms part of an electronic component that is arranged to receive the FRUs, which host them.

In this example embodiment, connector 22 serves as an electrical connector for passing electrical currents or signals between unit 10 and circuit board 20. Connector 22 can also serve as a mechanical connector. One example of a host device is a computer server, although other embodiments of the proffered concept can readily include any type of electronic components (e.g., a loadbalancer, a gateway, a personal computer, a personal digital assistant (PDA), an I-Phone, a laptop, etc.) in which failures can be identified in order to replace a given unit. This may include hosting configurations (as discussed herein) or other arrangements where more simplistic replacement activities occur.

Units 10 and 30, in this example configuration, incorporate a fan 24, which can serve to cool the host electronic component. Unit 30 is disconnected from circuit board 20 but is ready to form a connection to its host. The electronic units, as used herein in this Specification, are not limited to fan architectures and could also be a hard drive, a logic board, a camera, a speaker, a microprocessor, a memory element, or any other component, which is capable of being replaced [potentially] while salvaging some of the associated electronic equipment. Often times, this would implicate a component, module, or device in any electronic system that can be repaired or replaced without sending the unit back to the manufacturer (e.g., in situ). One objective in any such replacement scenario is to accurately identify an FRU failure in such a way as to facilitate a proper replacement without inadvertently disconnecting the wrong FRU.

Units 10 and 30 can have a body structure 48 with a longitudinal axis 50 along which front end 52 and back end 54 are spaced. Back end 54 is arranged to face outwardly from circuit board 20 and a host device in this example configuration. A light output 36 is located adjacent to back end 54 for easy viewing by a person, who wishes to observe the status of the installed field replaceable unit. Light output 36 terminates a section of a light guide 56, which can extend adjacent or parallel to axis 50. This section guides the light from front end 52 to back end 54 of units 10 and 30. This could be advantageous if a light emitting diode (LED) were located adjacent to front end 52 of the installed field replaceable unit.

In this example embodiment, a light input 34 terminates a section of a light guide 58 that runs perpendicular to axis 50. This section of light guide 58 transports the light that is transmitted substantially perpendicular to circuit board 20 and axis 50 and, further, through a curved section 60 that changes the direction of light propagation (from somewhat perpendicular to somewhat parallel to an axis). In some embodiments, a unit status indicator light 46 may be mounted on an edge 62 of the circuit board, where a single straight section of light pipe may be required to transport the light from the front to the back of unit 10 and 30.

The example embodiments shown in FIG. 1 may be configured by taking a fan unit and adapting it without significant modification. Light guide 32 can pass through several apertures 64 (such as those shown in FIGS. 1-2). In one example implementation, these apertures are formed to receive a set of mechanical fasteners 66 (e.g., bolts or screws), which attach fan 24 to body structure 48.

Figure 2:
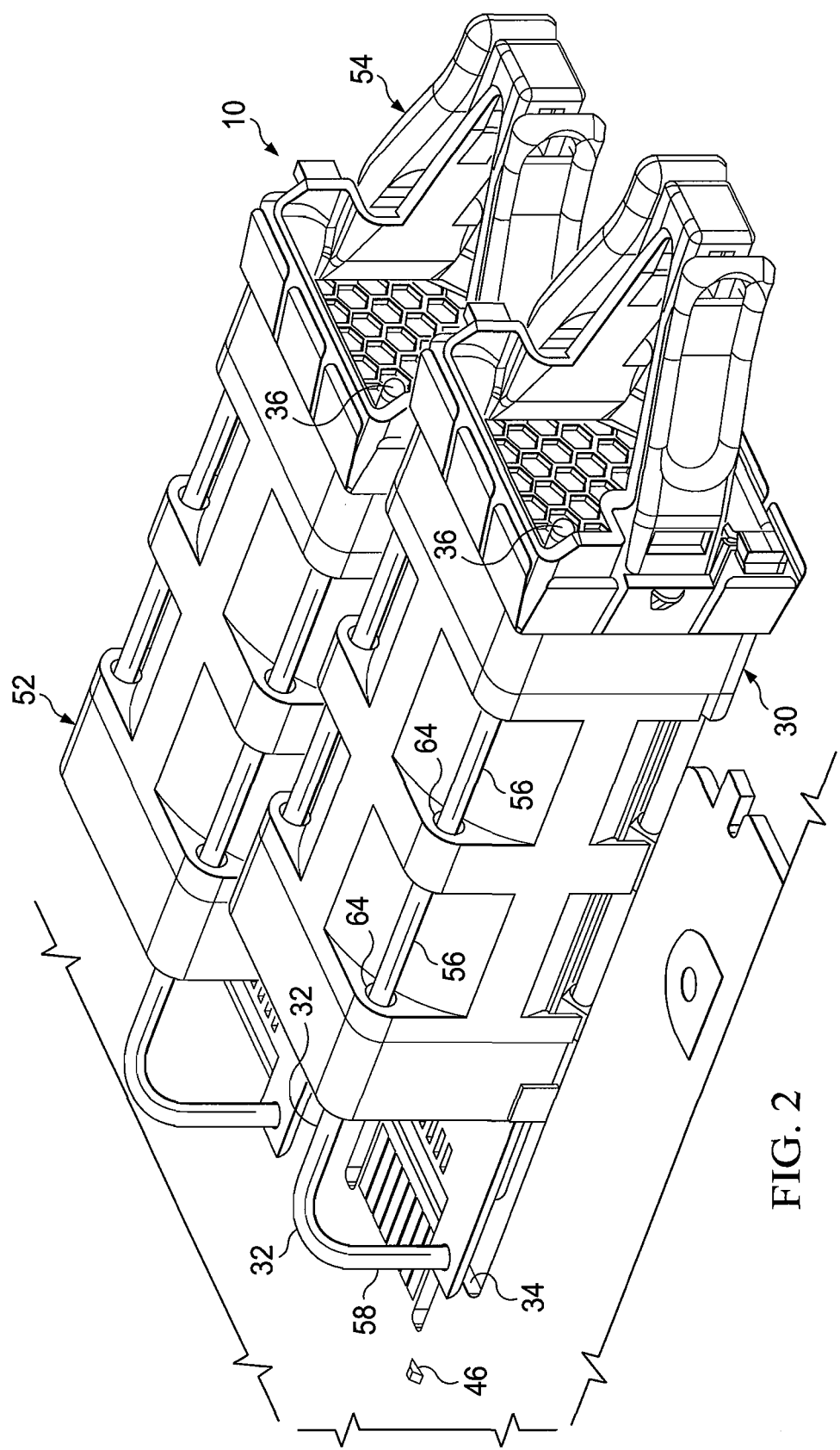
FIG. 2 illustrates a rear perspective view of the electronic units of FIG. 1 in accordance with one embodiment.

Turning to FIG. 2, which can be discussed in conjunction with FIG. 1, FIG. 2 illustrates a rear perspective view of the units of FIG. 1 in accordance with one embodiment. In this example embodiment, a light guide 32 is provided to unit 30 in the form of a light pipe. Note that the shape of this light element (being a pipe in the illustrated example) can be changed considerably without departing from the concept presented herein. For example, square-shaped or hexagon-shaped light elements could also be used. In addition, cables or wires could be used as the light element (where these elements can carry optical energy). As used herein in this Specification, all such alternatives and permutations of the light element are included within the term 'light guide.'

The light pipe, in this example, extends between light input 34 and to light output 36. Light output 36 is designed and positioned relative to unit 10 and 30 to be visible when it is installed in the host apparatus. Note that in this particular design, the light pipe terminates at approximately the same end point or edge as the associated electronic component in order to minimize any potential interference with the operations of the electronic component.

In this embodiment, light input 34 is arranged to capture a light 44 from a light source. In this example, the light source is unit status indicator light 46, which could be in the form of an LED [or other similar illuminating element] of the host electronic component. Status indicator light 46 indicates the status of unit 30. In this embodiment, unit status indicator light 46 is mounted on circuit board 20. In this particular design, light input 34 is constructed (and finished) with a flat face to enhance the light coupling mechanism seen by a given end user. In a similar manner, light output 36 is finished with a spherical surface to widely broadcast light such that a person could clearly see the light being projected. Light input 34 is fixed in position relative to unit 30 by a light input locator 38 projecting away from unit 30. Light input locator 38 has an aperture 40 through which light guide 32 passes.

Figure 3:
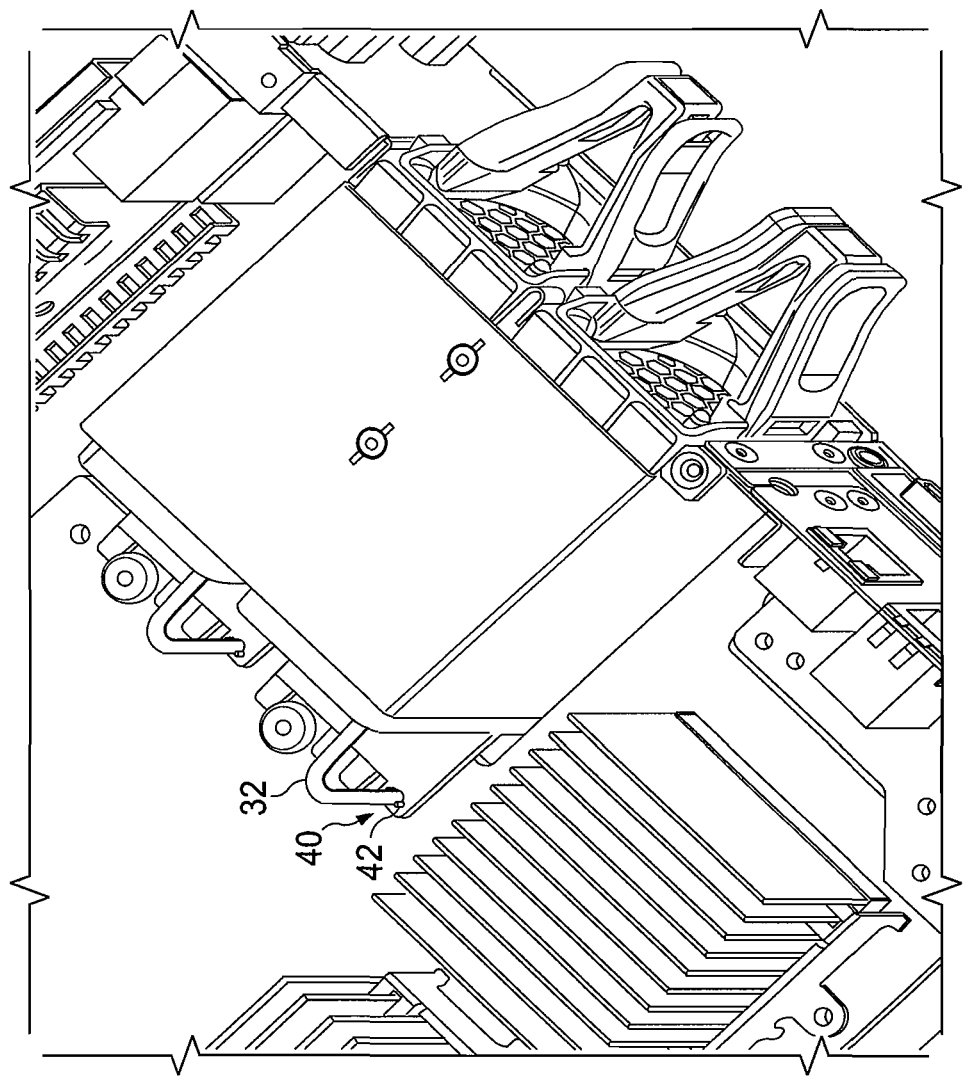
FIG. 3 is a simplified schematic diagram that illustrates a top perspective view of two example electronic units in accordance with one embodiment.

FIG. 3 is a simplified schematic diagram that illustrates a top perspective view of two example electronic units in accordance with one embodiment. In some embodiments, as shown in FIG. 3, light guide 32 incorporates mechanical stops 42, which limit the insertion of light guide 32 through aperture 40. In some other embodiments, stops 42 may be associated with light input locator 38, for example, inclusive of a flange projecting into the aperture 40.

In the embodiments shown in FIGS. 1-3, the light element is a light guide 32, which is fabricated from a molded plastic (e.g., LEXAN) having a suitable diameter to minimize its space consumption, while providing an elegant and sturdy tool. In one example, the diameter of the light element does not exceed one eighth of an inch. The light pipe can be arranged by way of stops 42 such that the face of light input 34 is spaced apart from unit status indicator light 46 (e.g., by around 0.025"), when unit 30 is connected to circuit board 20. This could prevent damage to unit status indicator light 46 and, further, allow unit 30 to easily slide into a connection with circuit board 20.

In some embodiments, unit status indicator light 46 may give signals to a person observing it, for example, by way of flashes, color, intensity changes, by signaling something to an end user that triggers the feedback (e.g., via a test button), etc. These signals can indicate various operational states of the units, such as fan speed, failure, fault issues, a short circuit, a fuse outage, an internal error, a slowdown of a fan, an overheating issue, a locked rotator, or any other appropriate state. The state could be determined remotely by circuit board 20, through a tool used by a technician, or determined by the unit itself. Light 44 can be transmitted from circuit board 20 to the back of the FRU by light guide 32 instead of having a light mounted directly on the FRU. This could be advantageous because extra wiring does not need to be added to the fan, which is generally manufactured and supplied with only power wiring. In one example implementation, there is no need for an LED light to be incorporated into the fan hub (e.g., by the vendor of the fan) with associated electrical connections. Incorporating a light into the fan may require modified tooling and an assembly process: in addition to at least two extra wires being provisioned in a housing that is typically limited to three wires. These extra requirements limit the choice of fan vendors, which is unnecessarily restrictive.

In one example embodiment, connector 22 also functions as a positioning element for aligning the FRU relative to circuit board 20. This could allow unit status indicator light 46 to be properly placed near light input 34, when the field replaceable unit is installed and connected to circuit board 20 (without any additional and optical alignment being necessary). Thus, light input 34 and unit status indicator light 46 are optically aligned to provide a viable coupling between them by virtue of a positioning element.

Note that some of these implementations described above can offer a number of advantages. For example, the use of a light pipe to transmit light from an indicator light on the host device eliminates the need to include an LED and associated wiring on the FRU itself. In addition, existing infrastructure (e.g., holes) can be used to attach the light pipe. In terms of design, the indicator light is located on the circuit board close to the associated control circuitry, which minimizes excess wiring and improves the ease of manufacture. Also, a given fan vendor does not need to create a special fan with the wiring and the LED. In many cases, the fan vendor need not modify his tooling and assembly process. The light pipe solution can be used on many different types of units.

It is imperative to note that all of the specifications and relationships outlined herein (e.g., height, width, length, pipe diameter, etc.) have only been offered for purposes of example and teaching only. Each of these data may be varied considerably without departing from the spirit of the present invention, or the scope of the appended claims. The specifications apply only to one non-limiting example and, accordingly, should be construed as such.

It is important to note that the steps in the preceding FIGURES illustrate only some of the possible scenarios that may be executed by, or within, the presented architecture. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the proffered system in that any suitable arrangements, chronologies, configurations, and timing mechanisms may be provided without departing from the teachings of the described concept.

Although the present invention has been described in detail with reference to particular embodiments, it should be understood that various other changes, substitutions, and alterations may be made hereto without departing from the spirit and scope of the present invention. The illustrated device and operations have only been offered for purposes of example and teaching. Suitable alternatives and substitutions are envisioned and contemplated by the present invention: such alternatives and substitutions being clearly within the broad scope of the proposed solutions. In addition, while the foregoing discussion has focused on electronic units associated with fans, any other suitable unit prone to failure or malfunction (and, hence, replacement) may benefit from the teachings provided herein. It should also be noted that the failure system described herein may be constructed of any suitable combination of rubber, plastic, metal, or any other viable composition that could withstand and readily accommodate the forces as explained herein.

Numerous other changes, substitutions, variations, alterations, and modifications may be ascertained to one skilled in the art and it is intended that the described concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
   an electronic field replaceable unit;
   and
   a light guide extending along a body structure of the electronic field replaceable unit, wherein the light guide can communicate optical energy from a status indicator light at an end that the light guide terminates, wherein the status indicator light is mounted on an edge portion of a circuit board of an electronic component and is separate from the electronic field replaceable unit, wherein the status indicator light provides a visual indication of a current operational state of the electronic field replaceable unit.

2. The apparatus of claim 1, wherein the status indicator light is a light emitting diode (LED) that indicates the operational state of the electronic field replaceable unit.

3. The apparatus of claim 1, wherein the light guide includes a light input that enhances an optical coupling between the status indicator light and the light guide.

4. The apparatus of claim 1, wherein the status indicator light is optically aligned with a light source in order to indicate the operational state of the electronic field replaceable unit.

5. The apparatus of claim 1, wherein the light guide passes through one or more apertures of the body structure.

6. The apparatus of claim 1, wherein the status indicator light emits flashes to signal the operational state of electronic field replaceable unit.

7. The apparatus of claim 1, wherein the electronic field replaceable unit is a hard drive associated with the electronic component.

8. The apparatus of claim 1, wherein the electronic field replaceable unit is coupled to the circuit board via a connector.

9. The apparatus of claim 1, wherein the electronic field replaceable unit is hosted by the electronic component.

10. The apparatus of claim 1, wherein the electronic component is a server.

11. The apparatus of claim 1, wherein the operational state is an internal error or a failure of the electronic field replaceable unit.

12. The apparatus of claim 1, wherein the light guide includes mechanical stops limiting insertion of the light guide through apertures coupled to the body structure.

13. The apparatus of claim 1, wherein the light guide is a pipe, which is constructed of molded plastic, or a cable that can carry optical energy.

14. The apparatus of claim 1, wherein the status indicator light is physically separate from the electronic field replaceable unit.

15. An apparatus, comprising:
    an electronic field replaceable unit, which is a replaceable unit of an electronic component, wherein the electronic component is configured to accept more than one electronic field replaceable unit and each electronic field replaceable unit is removable from the electronic component;
    and
    a light guide extending along a body structure of the electronic field replaceable unit, wherein the light guide can communicate optical energy from a status indicator light at an end that the light guide terminates, wherein the status indicator light is mounted on an edge portion of a circuit board of the electronic component and is separate from the electronic field replaceable unit, wherein the status indicator provides a visual indication of a current operation state of the electronic field replaceable unit.

16. The apparatus of claim 15, wherein the light guide passes through one or more apertures of the body structure and the electronic field replaceable unit is a fan used for cooling the electronic component.

* * * * *